(12) United States Patent
Varela et al.

(10) Patent No.: US 9,092,057 B2
(45) Date of Patent: Jul. 28, 2015

(54) ELECTRONIC DEVICE INCLUDING TOUCH-SENSITIVE DISPLAY AND ACTUATOR FOR PROVIDING TACTILE FEEDBACK

(75) Inventors: Felipe Alonso Varela, Sunrise, FL (US); Aaron Robert Allen, Pembroke Pines, FL (US); Martin Earl Holman, IV, West Palm Beach, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 311 days.

(21) Appl. No.: 13/027,986

(22) Filed: Feb. 15, 2011

(65) Prior Publication Data
US 2012/0038562 A1  Feb. 16, 2012

Related U.S. Application Data

(60) Provisional application No. 61/304,544, filed on Feb. 15, 2010.

(51) Int. Cl.
*G06F 3/00* (2006.01)
*G06F 3/01* (2006.01)
*G06F 3/043* (2006.01)
*G06F 3/041* (2006.01)

(52) U.S. Cl.
CPC .............. *G06F 3/016* (2013.01); *G06F 3/0414* (2013.01); *G06F 3/0436* (2013.01); *G06F 3/041* (2013.01)

(58) Field of Classification Search
CPC ...................................................... G06F 3/041

USPC .......................................................... 345/173
See application file for complete search history.

(56) References Cited

U.S. PATENT DOCUMENTS

| 7,006,854 | B2 | 2/2006 | Choi |
| 2006/0114646 | A1 | 6/2006 | Koibuchi et al. |
| 2006/0146014 | A1 | 7/2006 | Lehtonen |
| 2007/0146343 | A1* | 6/2007 | Prados ........................... 345/173 |
| 2008/0100568 | A1 | 5/2008 | Koch et al. |
| 2008/0117573 | A1 | 5/2008 | Im et al. |
| 2008/0146297 | A1* | 6/2008 | Ho .............................. 455/575.4 |
| 2009/0027836 | A1 | 1/2009 | Wakihara |
| 2009/0072662 | A1* | 3/2009 | Sadler et al. .................. 310/319 |
| 2009/0296341 | A1 | 12/2009 | Eldershaw |
| 2010/0053116 | A1* | 3/2010 | Daverman et al. ............ 345/175 |
| 2010/0220065 | A1 | 9/2010 | Ma |

OTHER PUBLICATIONS

Office Action mailed Apr. 9, 2013, in corresponding Canadian patent application No. 2,731,708.
Office Action mailed Jul. 15, 2013, in corresponding Canadian patent application No. 2,731,708.
Office Action mailed May 30, 2014; in corresponding Canadian patent application No. 2,731,708.

* cited by examiner

*Primary Examiner* — Amare Mengistu
*Assistant Examiner* — Joseph G Rodriguez
(74) *Attorney, Agent, or Firm* — Fish & Richardson P.C.

(57) ABSTRACT

An electronic device includes a housing, a touch-sensitive display exposed by a front of the housing, an actuator disposed between a back and the front of the housing and configured to move the touch-sensitive display and the front of the housing relative to the back when actuated, and functional components comprising memory and a processor coupled to the memory and the touch-sensitive display.

17 Claims, 10 Drawing Sheets

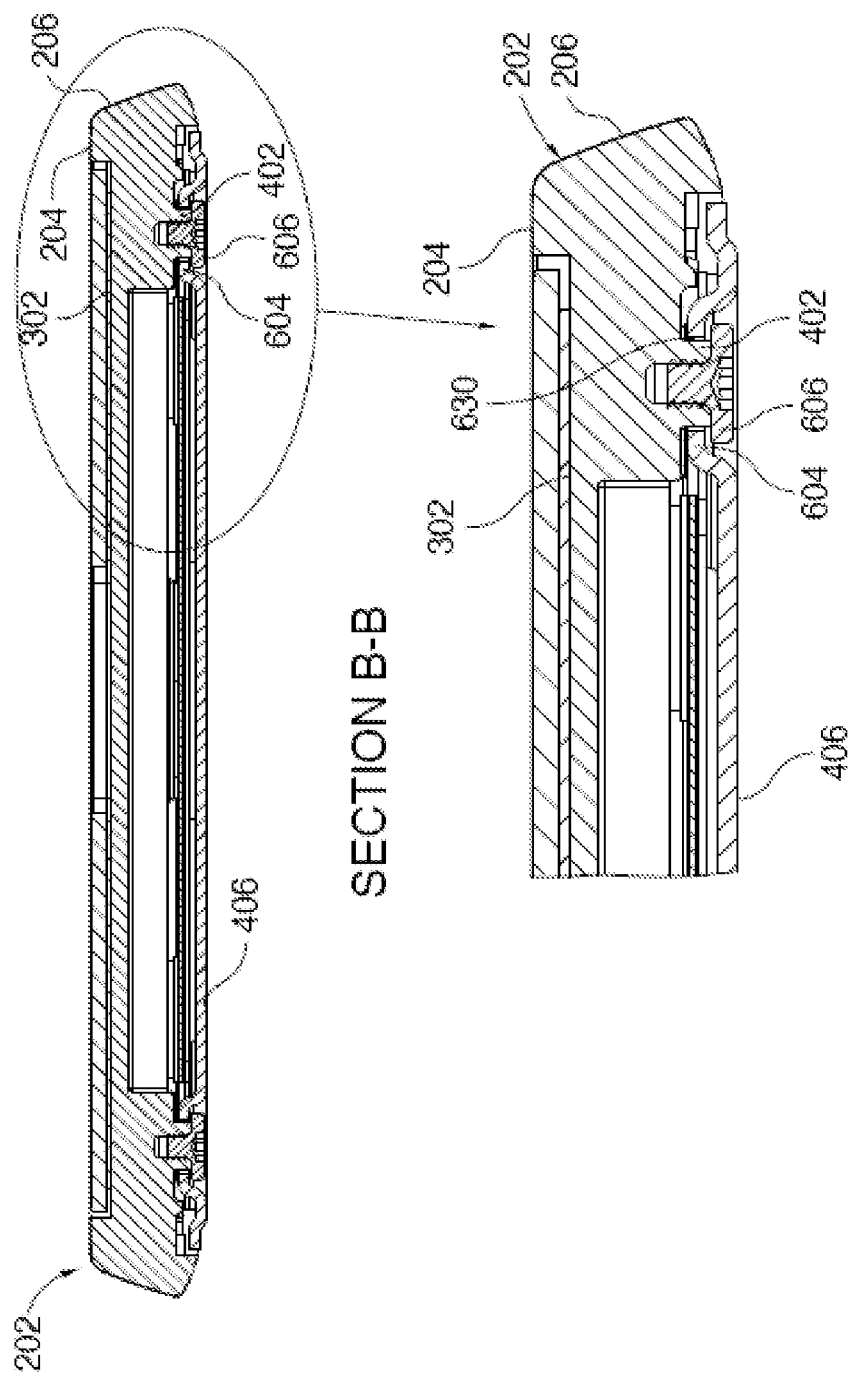

ELECTRONIC DEVICE INCLUDING TOUCH-SENSITIVE DISPLAY AND ACTUATOR FOR PROVIDING TACTILE FEEDBACK

CROSS-REFERENCE TO RELATED APPLICATIONS

The present application claims the benefit of priority of U.S. Provisional Patent Application No. 61/304,544, filed Feb. 15, 2010, which is incorporated herein by reference in its entirety.

FIELD OF TECHNOLOGY

The present disclosure relates to an electronic device including an actuator for providing tactile feedback at a touch-sensitive display.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as simple cellular phones, smart phones, Personal Digital Assistants (PDAs), and laptop computers.

Devices such as PDAs or smart phones are generally intended for handheld use and ease of portability. Smaller devices are generally desirable for portability. Touch-sensitive devices constructed of a display, such as a liquid crystal display (LCD), with a touch-sensitive overlay are useful on such handheld devices as such handheld devices are small and are therefore limited in space available for user input and output devices. Further, the screen content on the touch-sensitive devices can be modified depending on the functions and operations being performed.

Tactile feedback for such touch-sensitive input devices provides a positive confirmation of, for example, touch selection. The provision and control of tactile feedback in touch-sensitive devices is desirable.

BRIEF DESCRIPTION OF THE DRAWINGS

Embodiments of the present disclosure will now be described, by way of example only, with reference to the attached Figures, wherein:

FIG. 4B is a sectional view through the line B-B of the portable electronic device of FIG. 4A;

DETAILED DESCRIPTION

Figure 1:
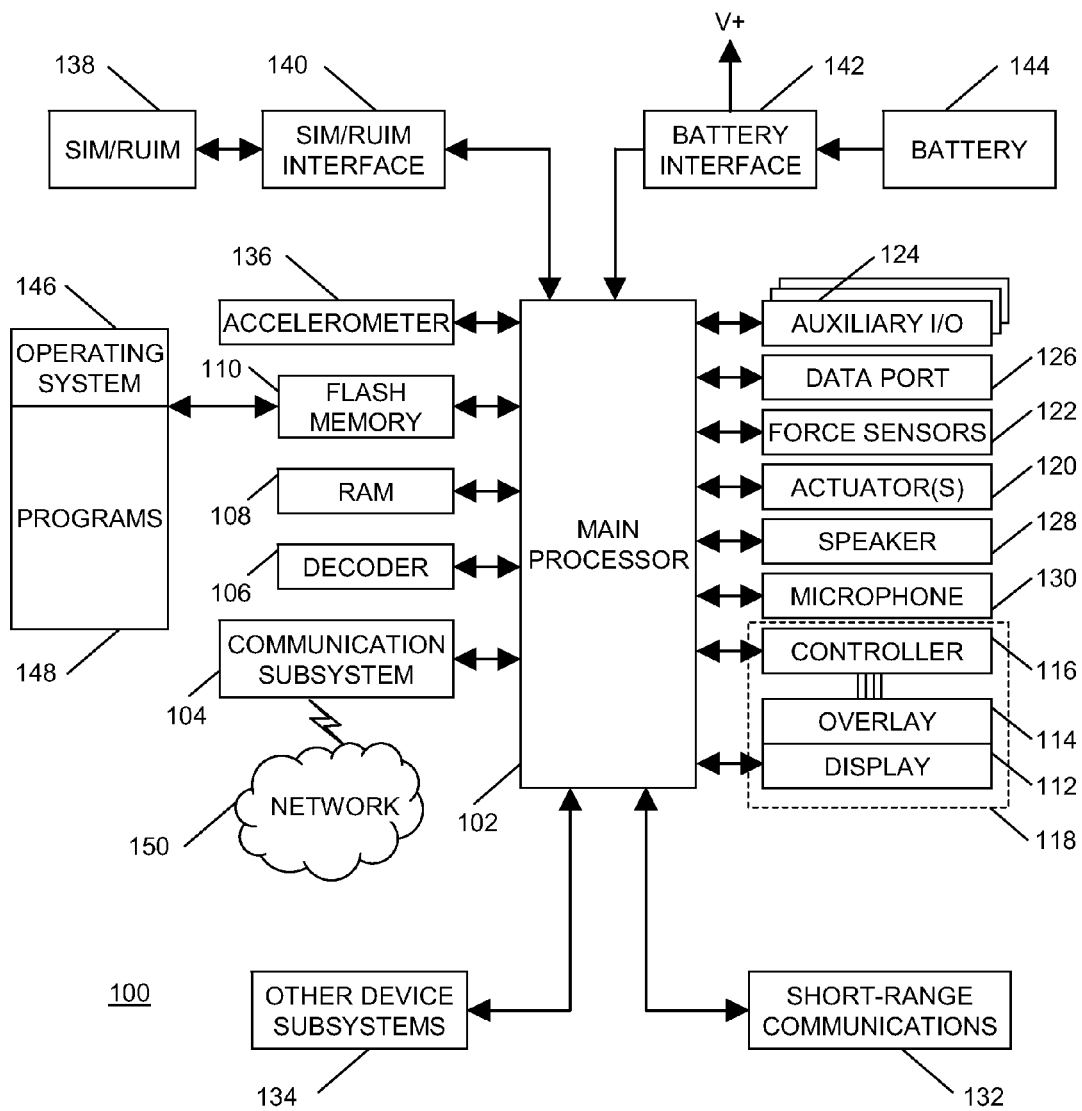
FIG. 1 is a simplified block diagram of components including internal components of a portable electronic device according to an example embodiment.

The following describes an electronic device that includes a housing, a touch-sensitive display exposed by a front of the housing, an actuator disposed between a back and the front of the housing and configured to move the touch-sensitive display and the front of the housing relative to the back when actuated, and functional components comprising memory and a processor coupled to the memory and the touch-sensitive display.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

Tactile feedback is provided by movement of the touch-sensitive display relative to the back. The front of the housing is moved along with the touch-sensitive display relative to the back. The movement of both the touch-sensitive display and the front of the housing provides for tactile feedback absent movement of the touch-sensitive display relative to the front of the housing. Gaps between the touch-sensitive display and the housing are not required as relative movement is not required. Dust or water ingress from the front surface of the portable electronic device is inhibited, increasing usable lifetime of the portable electronic device.

Example embodiments of the actuator assembly described herein are adapted for use in an electronic device such as a portable electronic device that includes a touch-sensitive display. FIG. 1 shows a simplified block diagram of components including internal components of a portable electronic device according to an example embodiment.

The portable electronic device 100 includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an actuator assembly 120, one or more force sensors 122, an auxiliary input/output (I/O) subsystem 124, a data port 126, a speaker 128, a microphone 130, short-range communications 132 and other device subsystems 134. User-interaction with the graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2:
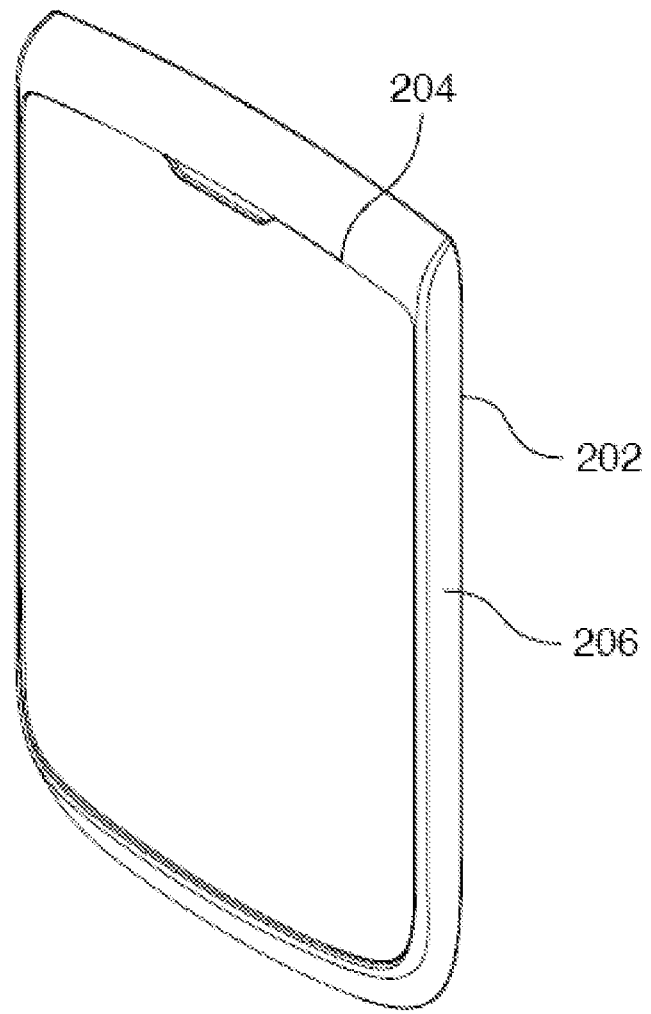
FIG. 2 is a perspective view of an example of a portable electronic device.

FIG. 2 is a perspective view of an example of a portion of a portable electronic device 100. The portable electronic device 100 includes a housing 202 that is suitable for housing internal components shown in FIG. 1. The housing 202 includes a front 204 that frames the touch-sensitive display 118 such that the touch-sensitive display is exposed for user-interaction, and sides 206.

The touch-sensitive display 118 may be a capacitive touch-sensitive display, for example and a user's touch on the touch-sensitive display may be determined by determining the X and Y location of the touch, with the X location determined by a signal generated as a result of capacitive coupling with a touch sensor layer and the Y location determined by the signal generated as a result of capacitive coupling with another touch sensor layer. Each of the touch-sensor layers provides a signal to the controller 36 that represents the respective X and Y touch location values. Thus a feature such as a virtual button or other feature displayed on the touch-sensitive display 118 may be selected by a mapping of the touch location to a feature on the touch-sensitive display 118.

Figure 3:
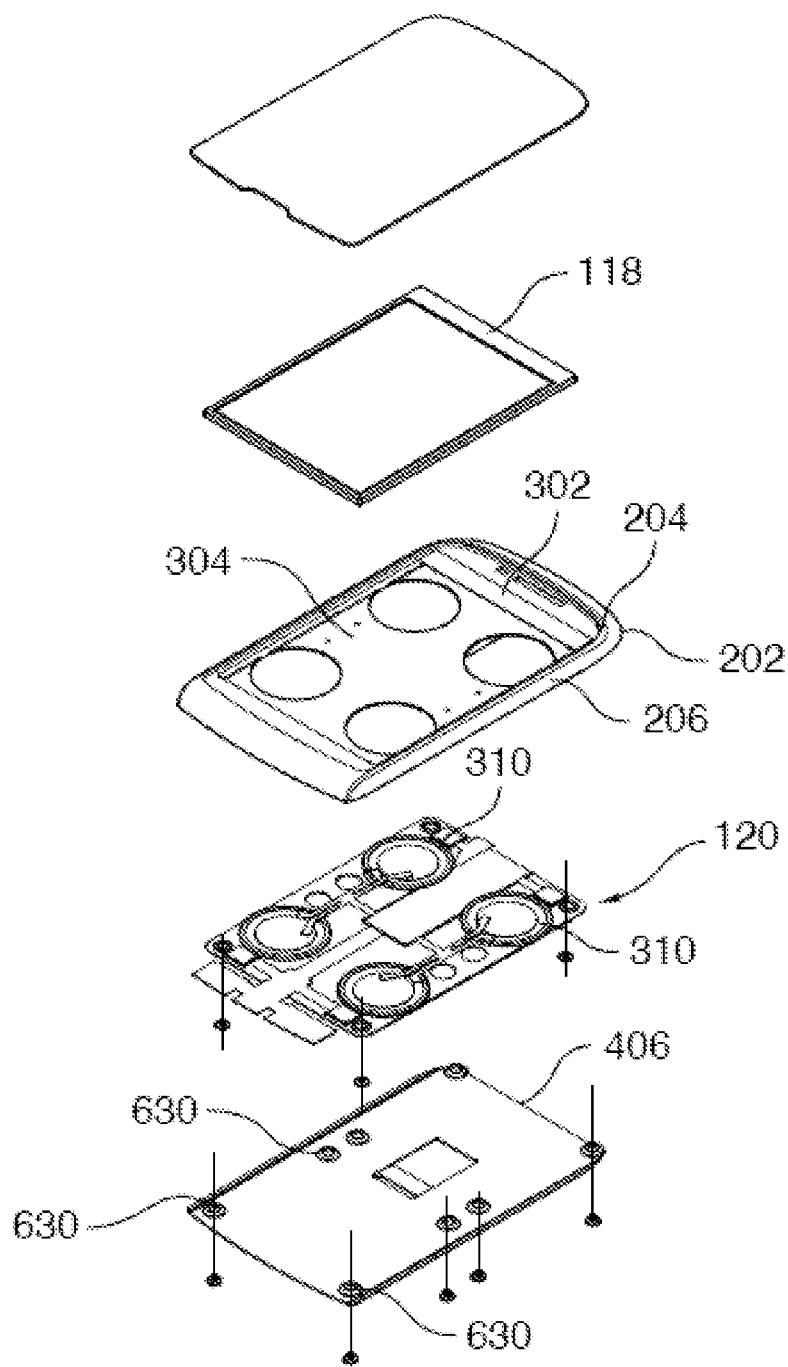
FIG. 3 is an exploded view of the portable electronic device of FIG. 2, including an actuator assembly in accordance with an example embodiment.
Figure 4A:
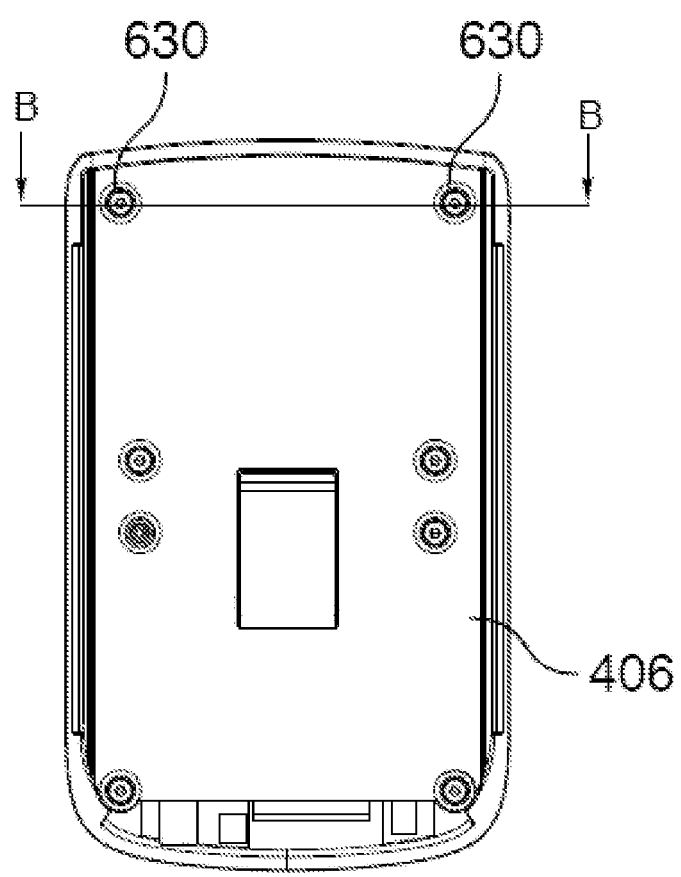
FIG. 4A is a rear view of the portable electronic device of FIG. 2.
Figure 5A:
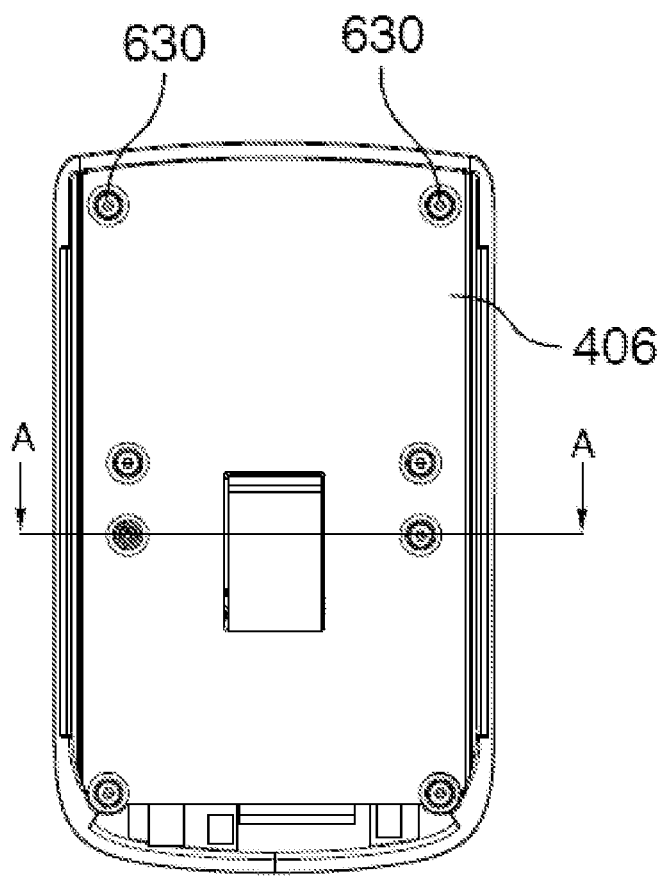
FIG. 5A is a rear view of the portable electronic device of FIG. 2.
Figure 5B:
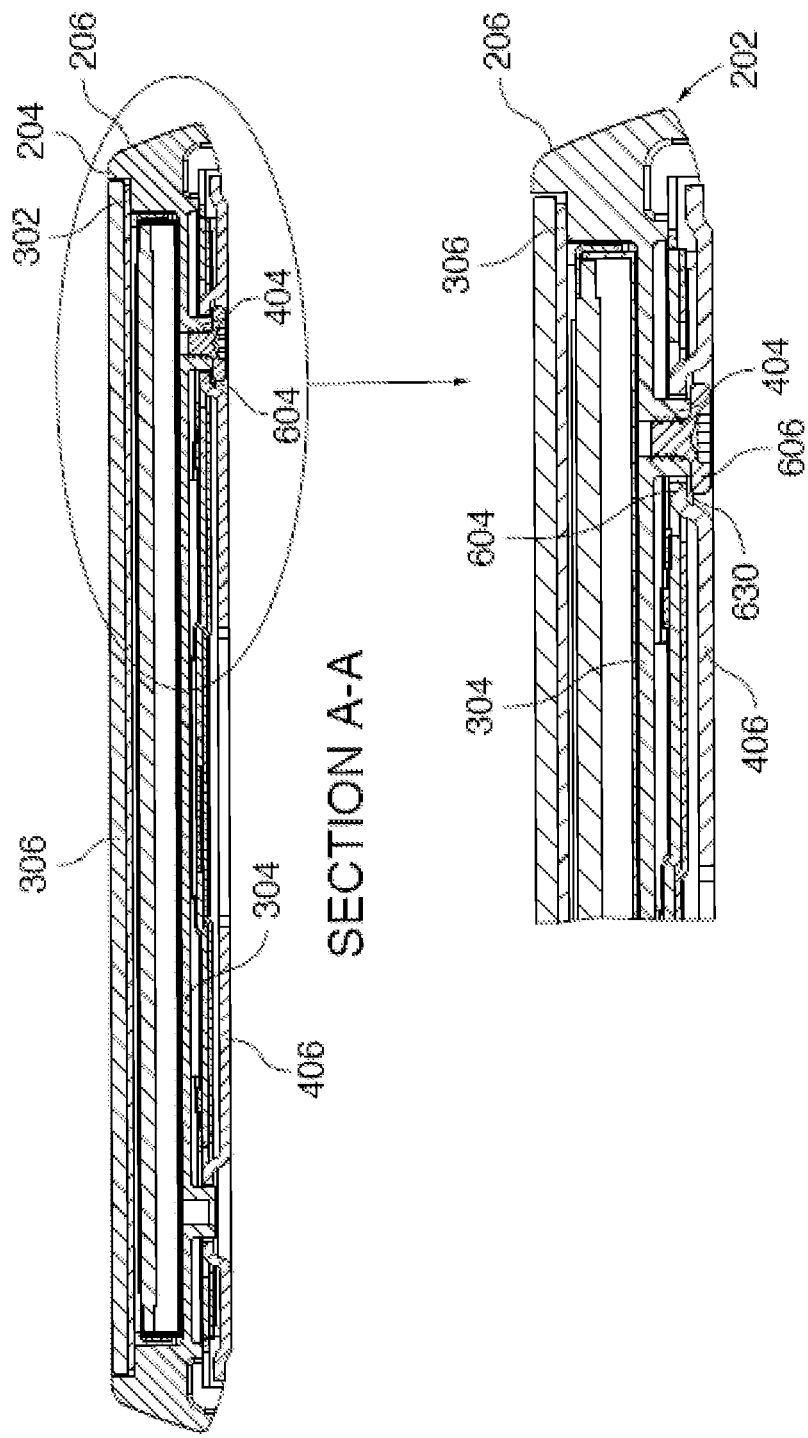
FIG. 5B is a sectional view through the line A-A of the portable electronic device of FIG. 5A.

Referring now to FIG. 3, FIG. 4 and FIG. 5, the housing 202 of the portable electronic device 100 includes the front 204, that frames the touch-sensitive display 118, and sides 206, that together form a recess in which the touch-sensitive display 118 is disposed. The recess extends from the front 204 to a base 304 on which the components of the touch-sensitive display 118 are supported. A step 302, between the base 304 and the front 204, extends around the periphery of the recess and a protective cover 306 is disposed on the step 302. The touch-sensitive display 118 is therefore disposed between the protective cover 306 and the base 304.

The base 304 is generally planar with four circular apertures extending through the base 304. Each aperture is spaced from a respective corner with two apertures located adjacent one side of the base 304 and the other two apertures located adjacent an opposing side of the base 304. The apertures are located to correspond with the locations of piezoelectric disk actuators 310 of the actuator assembly 120.

Referring now to FIG. 4 and FIG. 5, four outer screw bosses 402 project from a rear side of the housing 202, behind the step 302, with each of the four outer screw bosses 402 located near a respective corner of the housing 202. Four inner screw bosses 404 extend from a rear side of the base 304. Two of the four inner screw bosses 404 are located adjacent one side of the base 304, on opposite sides of a centerline of the base 304, and the other two inner screw bosses 404 are located adjacent the opposing side of the base 304, on opposite sides of the centerline. The four outer screw bosses 402 and four inner screw bosses 404 are utilized for stops for movement of the plate 406 that acts as a back of the housing 202.

In addition to the screw bosses 402, 404, inner threaded screw holes are also located in the rear side of the housing 202 for attachment of the actuator assembly 120 between the front 204 of the housing 202 and the plate 406 utilizing screws 624. The inner threaded screw holes are located adjacent the outer screw bosses 402.

Figure 6:
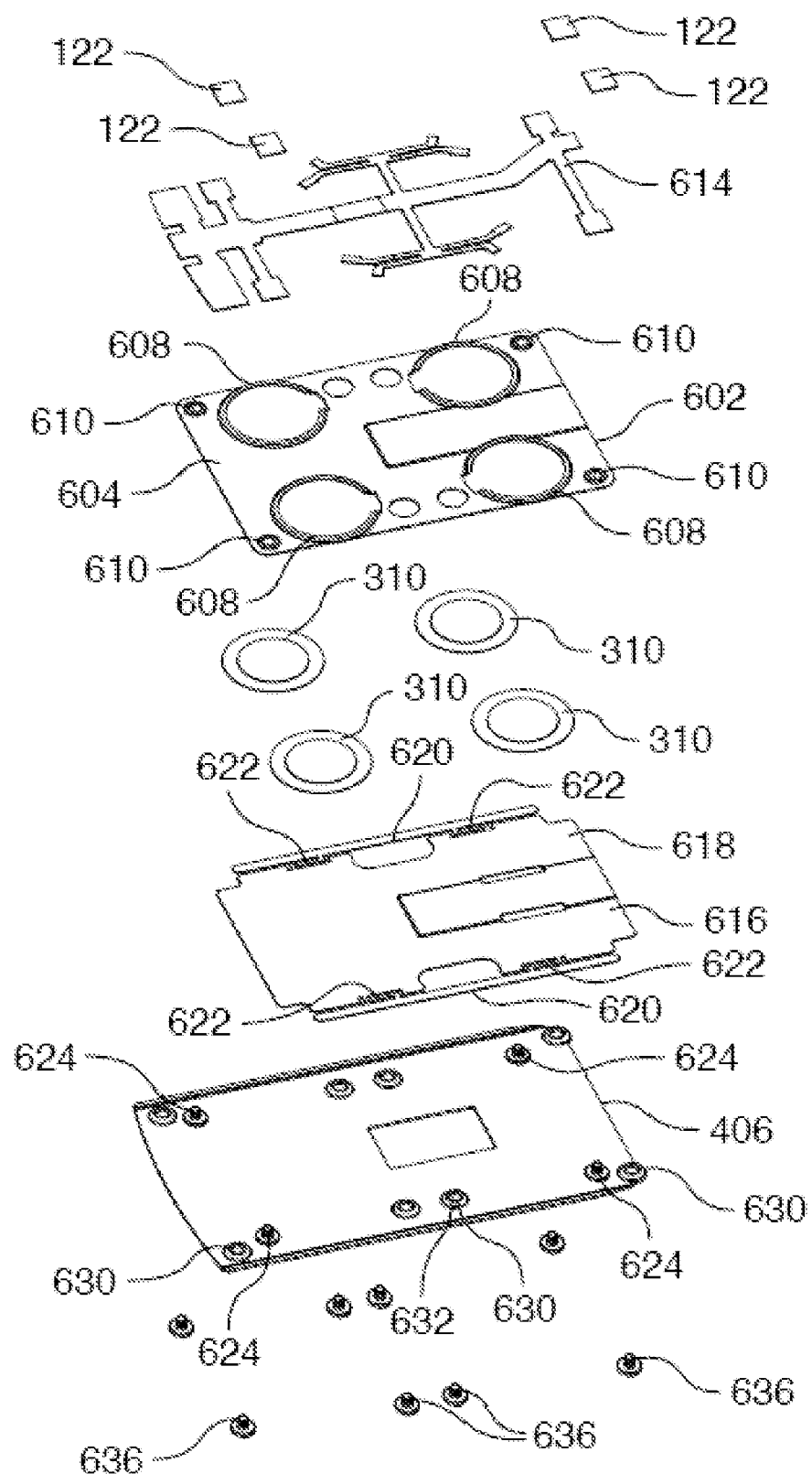
FIG. 6 is an exploded view of the actuator assembly and plate of the portable electronic device.

Referring now to FIG. 6, various views of the actuator assembly 120 are shown. In the presently described example embodiment, the actuator assembly 120 includes four piezoelectric actuators, which in the present embodiment are piezoelectric disk actuators 310. Different numbers of actuators 310 may be utilized in other embodiments. The actuators 310 are supported by a tray 602 that includes a generally flat portion 604 that is rectangular in shape. Multiple holes extend through the tray 602, including four screw holes that are located near respective corners of the generally rectangular tray 602. The screw holes are spaced for alignment with the inner threaded screw holes 408 of the housing 202. A margin surrounding each of the screw holes is deformed to provide a depression around the screw holes. The depression corresponds to a protrusion 610, which is formed when the depression is formed, on the opposite side of the tray 602. The depression is utilized to receive a head of a screw that extends through the screw holes and into the inner threaded screw holes 408 of the housing 202.

Four holes, which are larger than the screw holes and are referred to as disk holes, extend through the tray 602 and the tray 602 includes a recessed annular ledge 608, around each of the disk holes, in which a respective one of the actuators 310 is disposed while facilitating movement in the form of actuation of the actuators 310. The recessed annular ledges 608 provide a space between the tray 402 and the actuator sheet 616 in which the actuators 310 are disposed. The tray 402 may be formed of metal such as stainless steel.

A non-conductive tape (not shown) is disposed on the tray 602. The non-conductive tape is adhered to both the tray 602 and the actuators 310 and electrically isolates the actuators 310 from the tray 602. In the present example, the non-conductive tape covers the entire tray 602. Thus, the non-conductive tape covers the generally flat portion 604 and the recessed annular ledge 608 of the tray 602.

Each actuator 310 includes a piezoelectric disk such as a PZT ceramic disk adhered to a metal substrate of larger diameter than the piezoelectric disk for bending when the piezoelectric disk contracts diametrically as a result of build up of charge at the piezoelectric disk. The metal substrate of the actuators 310 is supported on the recessed annular ledge 608 with the non-conductive tape electrically isolating the metal substrate and the piezoelectric disk from the tray 602. The piezoelectric disk is located in the disk holes.

Each actuator 310 is adhered to a flexible printed circuit board 614 that includes conductive traces that are electrically connected to the piezoelectric disks to connect the actuators 310 to, for example, a printed circuit board of the portable electronic device 100. The flexible printed circuit board 614 is disposed on an outer surface of the tray 602 such that the flexible printed circuit board 614 is disposed on the outside of the actuator assembly 120. In the present example, the four force sensors 122 are mounted on the flexible printed circuit board 614, on the outside of the actuator assembly 120. Each of the force sensors 122 is located near a respective corner of the tray 602, between the flexible printed circuit board 614 and the base 304.

Figure 7:
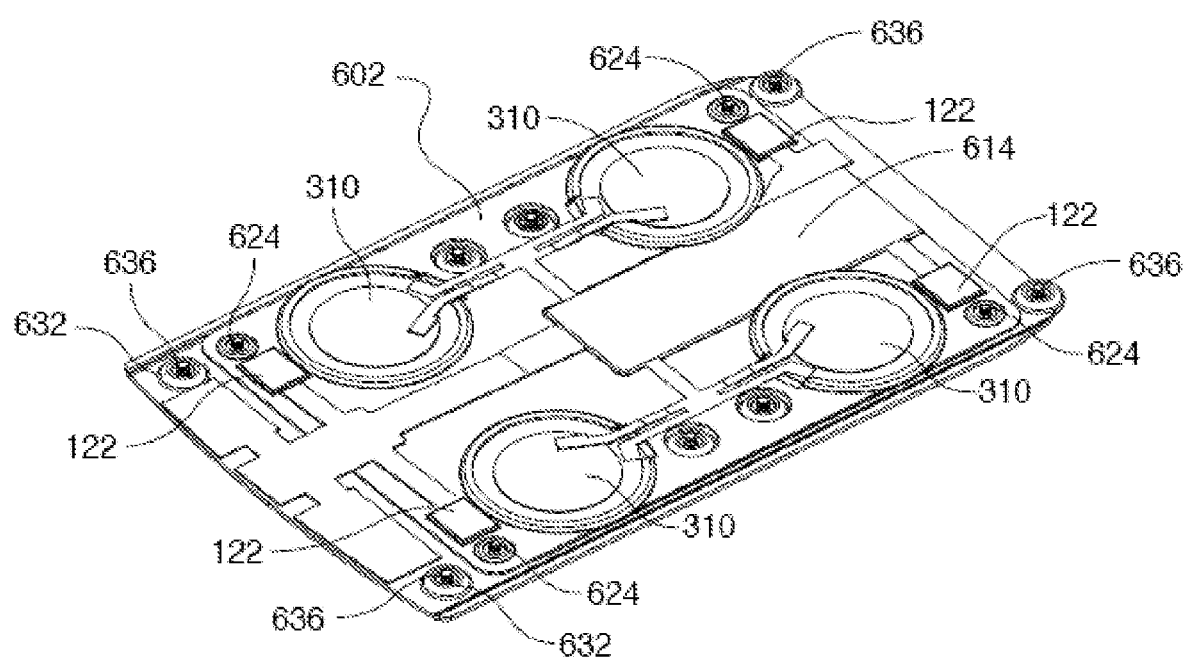
FIG. 7 is an assembled view of the actuator assembly and plate.
Figure 8:
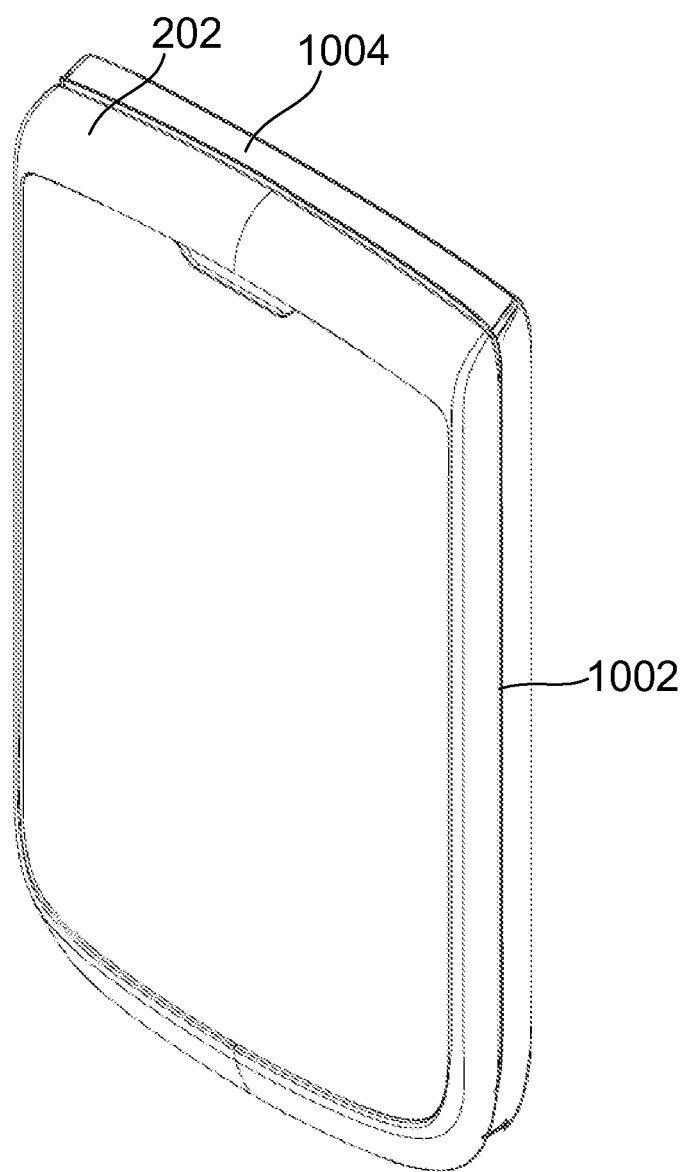
FIG. 8 is a perspective view of an example of an alternative embodiment of a portable electronic device.

Still referring to FIG. 6 and FIG. 7, an actuator sheet 616 covers the opposite side of the actuators 310 and is coupled to the tray 602. The actuator sheet 616 includes a generally rectangular inner sheet 618 and two side rails 620 on opposite sides of the inner sheet 618. The inner sheet 618 is spaced from each side rail 620 by a respective intermediate gap. Each intermediate gap is interrupted by resiliently flexible arms 622 that join the inner sheet 618 to the side rails 620. The arms 622 form a jog, such that the location at which each of the arms 622 joins the inner sheet 618 is offset from alignment with the location that the arm 622 joins one of the side rails 620, to facilitate movement of the inner sheet 618 relative to the side rails 620. The inner sheet 618, side rails 620 and resiliently flexible arms 622 may be integral portions of a sheet.

The side rails 620 are coupled to the tray 602 by, for example, spot welding each side rail 620 to the tray 602. Alternatively, the actuator sheet 616 may form a mechanical interlock with the tray 602. The inner sheet 618 is movable relative to the side rails 620 and the tray 602 when the actuators 120 are actuated. The actuator sheet 616 facilitates preloading of the actuators 310 during production of the actuator assembly 120 such that a bending force acts on the actuators 310, and the actuators 310 provide a spring force in return, when the actuators 310 are not charged and the actuator assembly 120 is in a rest position.

The actuator assembly 120 is connected to the base 304 by screws 624 inserted through the screw holes of the tray 602 and into the corresponding inner threaded screw holes in the base 304 of the housing 202. The screws 624 are tightened until the screws bottom out on screw bosses. The force sensors 122 are thereby preloaded as a compressive force is applied to the force sensors 122 between the flexible printed circuit board 614 and the base 304.

Referring now to FIG. 4 through FIG. 7, the plate 406 is generally rectangular and includes eight holes 630 for cooperating with the outer screw bosses 402 and inner screw bosses 404 of the housing 202. A margin of the plate 406 is deformed around the screw holes 630 to form a raised lip 632 around each of the holes 630. The eight screw holes 630 align with the outer screw bosses 402 and the inner screw bosses 404 and are larger than the outer diameter of the outer screw bosses 402 and the inner screw bosses 404 such that each of the holes 630 forms a clearance fit with a respective one of the outer screw bosses 402 and the inner screw bosses 404.

The plate 406 is attached to the inner sheet 618 of the actuator sheet 616 and is also coupled to the housing 202 by screws 636 that are inserted through the holes 630 of the plate 406 and into the outer screw bosses 402 and the inner screw bosses 404. The head of each of the screws 636 is larger in diameter than the diameter of the holes 630 to provide a stop for movement of the plate 406 relative to the housing 202 when the screws 636 are inserted. The outer screw bosses 402 and the inner screw bosses 404 project from the housing 202 by a distance that is greater than the thickness of the raised lip 632 of the plate 406 such that the plate 406 is moveable along the outer screw bosses 402 and the inner screw bosses 404, between the head of the screws 636 and the remainder of the housing 202. Resilient grommets may be utilized between the head of the screws 636 and the plate 406.

The actuator assembly 120 acts between the plate 406 and the base 304 of the housing 202 such that when the actuators 120 are actuated, a force is transmitted from the actuators 120, through the actuator sheet 616 and to the plate 406, to move the plate 406 relative to the touch-sensitive display 118 and the housing 202 of the portable electronic device 100 as the plate 406 slides along the outer screw bosses 402 and the inner screw bosses 404.

A charge applied to the actuators 310 of the actuator assembly 120 results in the piezoelectric ceramic disk shrinking diametrically, causing the metal substrate and therefore the entire actuator 310, to bend and apply a force to the inner sheet 618 of the actuator sheet 616. Because the inner sheet 618 is moveable relative to the tray 602, the inner sheet 618 is moved away from the tray 602 as the resiliently flexible arms 622 are flexed. The plate 406 is thereby moved, away from the tray 602, and thus, away from the housing 202 of the portable electronic device 100. Thus, the touch-sensitive display 118 and the front 204 of the housing 202 are moved relative to the plate 406, which acts as a back. The removal of the charge, causes the actuators 310 to return to the rest position and the resiliently flexible arms 622 facilitate movement of the inner sheet 618 to return to the rest position. Thus, the plate 406 is moved back to the rest position. The actuators 310 are connected through the flexible printed circuit board 614 to, for example, a printed circuit board of the portable electronic device 100 and may be controlled by drive circuitry connected to the processor 102 or other microprocessor.

The mechanical work performed by the actuators 310 may be controlled to control the force and movement of the touch-sensitive display 118 and the housing 202 relative to the plate 406, for example, in response to detection of a touch. Alternatively, the force sensors 122 measure an applied force by a user touch on the touch-sensitive display 118 and the actuators 310 may be controlled to provide movement of the touch-sensitive display 118 in response to detection of an applied force on the touch-sensitive display 118. Fluctuations in mechanical work performed as a result of, for example, temperature, may be reduced by modulating the current to the actuators 310 to control the charge. An increase in the charge increases the force on the plate 406, and thus the reaction force on the touch-sensitive display 118 and the housing 202, and a decrease in the charge decreases the force on the plate 406, and thus the reaction force on the touch-sensitive display 118 and the housing 202. In the present example embodiment, each of the actuators 310 is controlled equally and concurrently. It will be appreciated that the actuators 310 can be controlled separately, however. The portable electronic device 100 is controlled generally by modulating the force applied by the actuator assembly, between the touch-sensitive display 118 and the plate 406 to cause relative movement of the touch-sensitive display 118 and the front 204 of the housing 202, relative to the plate 406 in response to detection of a touch.

As indicated above, the plate 406 acts as a back of the housing. Optionally, the plate may be utilized for sliding engagement with a guide 1002 for a base portion 1004 that is slideable along the plate. In some example embodiments, the base portion 1004 includes an input apparatus such as navigation keys or buttons, a physical or virtual keyboard, a trackpad, trackball, multimedia keys, or the like. The base portion 1004 is therefore slideable with respect to the housing 202, along the plate, for concealing the base portion 1004 in a closed position and revealing the base portion 1004 in an opened position.

The embodiments shown and described herein illustrate examples only and many modifications may be made. For example, the number of actuators may differ.

An electronic device includes a housing, a touch-sensitive display exposed by a front of the housing, an actuator disposed between a back and the front of the housing and configured to move the touch-sensitive display and the front of the housing relative to the back when actuated, and functional components comprising memory and a processor coupled to the memory and the touch-sensitive display.

Tactile feedback is provided by movement of the touch-sensitive display 118 relative to the plate 406. The front of the housing is moved along with the touch-sensitive display relative to a plate. The movement of both the touch-sensitive display and the front of the housing provides for tactile feedback without moving the touch-sensitive display relative to the front of the housing. Gaps between the touch-sensitive display and the housing are not required as relative movement is not required. Dust or water ingress from the front surface of the portable electronic device is inhibited, increasing usable lifetime of the portable electronic device.

The actuator is also provided as an assembly of components for providing tactile feedback. Tolerance of such an assembly may be controlled to as the tolerance of the entire assembly may be controlled at a lower cost by comparison to providing a low tolerance for all the parts individually.

While the embodiments described herein are directed to particular implementations of the actuating assembly and the portable electronic device and the, it will be understood that modifications and variations may occur to those skilled in the art. All such modifications and variations are believed to be within the sphere and scope of the present disclosure.

What is claimed is:

1. An electronic device comprising:
   a housing including a front, sides, and a base;
   a back coupled to the housing and moveable relative thereto;
   a touch-sensitive display including a display and capacitive touch sensors, wherein the touch-sensitive display is disposed on the base of the housing and exposed by the front of the housing;
   an actuator disposed between the back and the front of the housing and configured to move the display and the capacitive touch sensors of the touch-sensitive display and the entire housing, including the front, sides, and base of the housing, relative to the back when the actuator is actuated, such that the touch-sensitive display and the entire housing move in a direction generally away from the back; and
   functional components comprising memory and a processor coupled to the memory and the touch-sensitive display.

2. The electronic device according to claim 1, wherein the back comprises a part of a sliding mechanism for sliding a base portion of the electronic device relative to the front of the housing.

3. The electronic device according to claim 2, wherein the back comprises a plate on which the base portion is slidable.

4. The electronic device according to claim 1, wherein the back is coupled to the front of the housing.

5. The electronic device according to claim 1, wherein the back is coupled to the front of the housing by a plurality of bolts or screws and movable relative to the front of the housing along the bolts or screws.

6. The electronic device according to claim 1, wherein the actuator comprises:
   a tray;
   an actuator sheet coupled to the tray, and
   a piezoelectric actuator between the tray and the actuator sheet, wherein a portion of the actuator sheet is movable relative to the tray when the piezoelectric device is actuated.

7. The electronic device according to claim 6, wherein the piezoelectric actuator comprises a piezoelectric disk disposed on a metal substrate.

8. The electronic device according to claim 6, wherein the actuator comprises a plurality of piezoelectric disk actuators between the tray and the actuator sheet.

9. The electronic device according to claim 8, wherein the tray includes apertures and a respective lip, around at least a portion of each aperture, in which the piezoelectric disk actuators are disposed.

10. The electronic device according to claim 6, wherein the actuator sheet includes first and second portions connected by a flexible connection, the first portion coupled to the tray and the second portion moveable relative to the tray.

11. The electronic device according to claim 10, wherein the first and second portions are connected by spring arms.

12. The electronic device according to claim 11, wherein the spring arms comprise thin portions of metal connecting the first and second portions.

13. The electronic device according to claim 11, wherein the first portion is welded to the tray.

14. The electronic device according to claim 11, wherein the second portion is connected to the back.

15. The electronic device according to claim 10, wherein the first portion comprises side rails on respective sides of the second portion.

16. The electronic device according to claim 6, comprising force sensors disposed on the tray.

17. The electronic device according to claim 16, wherein the force sensors are disposed between the tray and the touch-sensitive display.

* * * * *